Feb. 9, 1943.  E. S. TAYLOR  2,310,882
RESILIENT ENGINE MOUNT
Filed Nov. 13, 1939
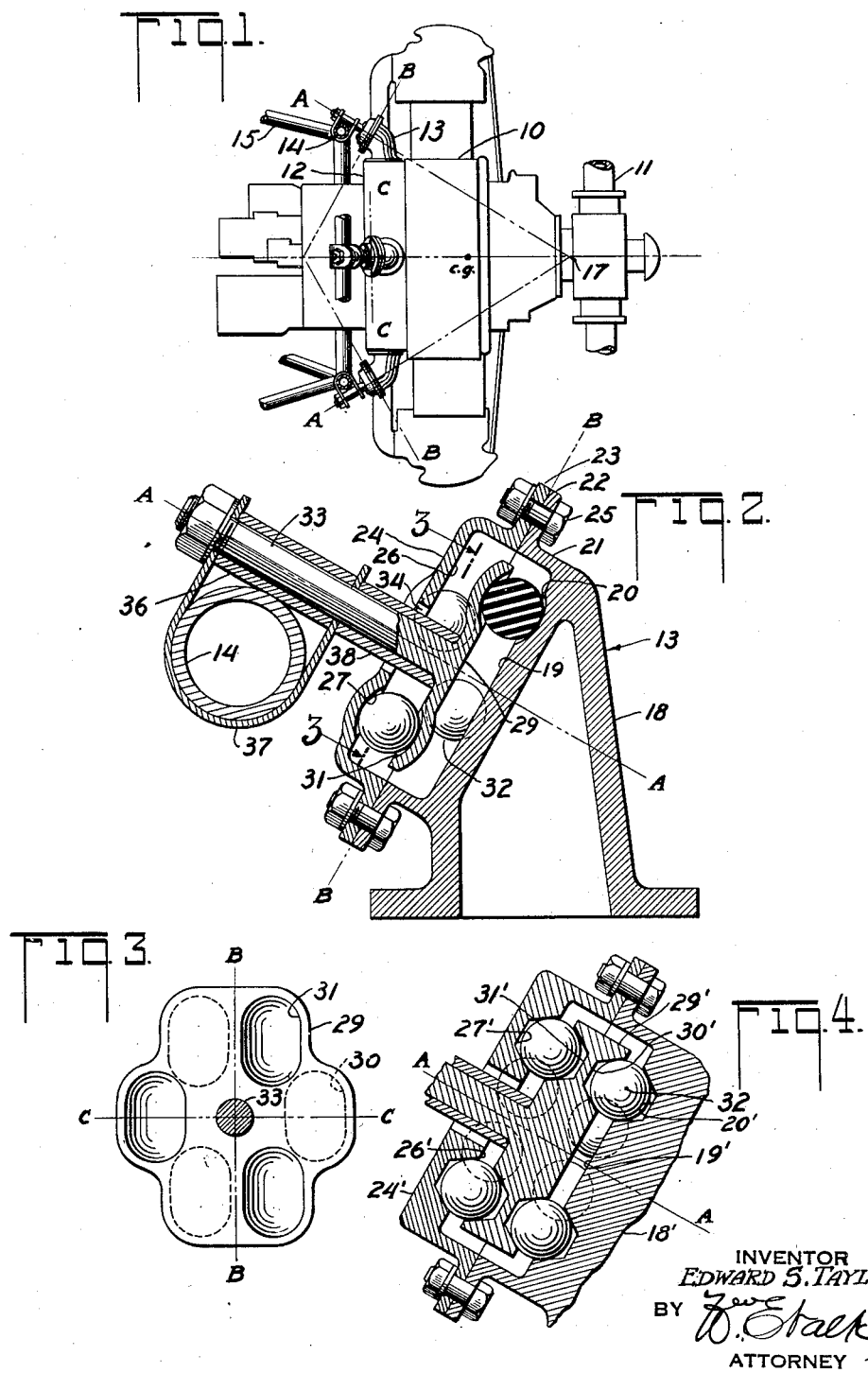
INVENTOR
EDWARD S. TAYLOR
BY
ATTORNEY Patented Feb. 9, 1943

2,310,882

UNITED STATES PATENT OFFICE 2,310,882

RESILIENT ENGINE MOUNT

Edward Story Taylor, Cambridge, Mass., assignor to Wright Aeronautical Corporation, a corporation of New York Application November 13, 1939, Serial No. 303,993

6 Claims. (Cl. 248—5)

This invention relates to resilient engine mounting devices and is particularly concerned with mounting mechanism for aircraft engines which are overhung from a supporting structure. When the engine is in operation certain vibrations are generated which will be transmitted to the aircraft structure unless suitable provision is made for isolating the engine from the structure.

In general, the invention is closely related to that covered in Browne & Taylor Patent No. 2,175,825 and in the Taylor Patent No. 2,175,999, both issued on October 10, 1939.

The invention has for an object the provision of a mounting device containing elastic balls so arranged that the mounting device as a unit will have three right-angled principal axes along which the spring rates are different, such different spring rates hinging upon the design of the members which carry the elastic balls. In the teachings of said prior patents, the stiffest of the three spring rates in the mounting devices thereof lie on principal axes which pass through the mounting devices and through the rotational axis of the power plant at a point more remotely spaced from the mounting plane than the aircraft center of gravity. The intermediate spring rate lies along an axis tangent to the mounting circle passing through the several mounting devices while the least stiff spring rate lies on an axis normal to the other principal axes and which passes through the mounting devices and through the rotational axis of the power plant on the opposite side of the mounting circle from the power plant center of gravity.

A further object of the invention consists in the provision of means for arranging elastic balls of rubber or the like in such a manner that they may roll along their supporting members to provide different spring rates and so that they may be compressed between the members for affording still another spring rate.

A further object resides in the provision of supporting members for the elastic balls which have therein depressions, for the reception of the balls, of such form that desired spring rates may be obtained as the balls roll in certain directions across the depressions.

Further objects of the invention will become apparent in reading the annexed detailed description in connection with the drawing, in which:

Fig. 1 is a side elevation of a mounted aircraft power plant embodying the mounting devices of the invention;

Fig. 2 is a longitudinal section, enlarged, through one of the mounting devices;

Fig. 3 is a section on the line 3—3 of Fig. 2; and

Fig. 4 is a longitudinal section through an alternate form of mounting device.

In Fig. 1 of the drawing is shown an aircraft engine 10 of the radial air-cooled type, provided at its forward end with a propeller 11 and at its rearward end with a casing 12 provided with peripheral pads upon which mounting devices 13 are secured, the latter being circumferentially disposed around the rotational axis of the engine. The devices 13 are secured to an engine mounting ring 14 rigid with a mounting structure 15 forming part of the aircraft structure, not shown. The mounting devices 13 are so arranged, as will shortly become apparent, that elastic axes A, B, and C thereof have different spring rates, the axis A slanting from the mounting device to the intersection 17 with the rotational axis of the engine, more remote from the plane of the devices 13 than the center of gravity of the power plant, indicated as c. g. The axis B is normal to the axis A and intersects the rotational axis of the engine rearward of the mounting plane, while axis C, normal to both axes A and B lies tangent to the mounting circle. According to the teachings of the above mentioned patents, the spring rates of the mounting devices along axes A must be relatively stiff; the spring rates along axes B must be very low or may be zero, and the spring rates along the axes C are preferably somewhat less stiff than those along the axis A.

The mounting devices are shown in detail in Figs. 2 and 3 and each comprises a pedestal 18 secured to the casing 12, the pedestal 18 having a slanted face 19 normal to the axis A and in which depressions 20 are formed. The surface 19 is bordered by a rim 21 having a flange 22 to which is secured the flange 23 of a concave cover plate 24 by bolts 25. The inside face 26 of the cover plate lies opposite to the face 19 and is also provided with depressions 27 alternately disposed around the axis A with respect to the depressions 20. Between the faces 19 and 26 is disposed a plate 29 having alternate recesses 30, 31 respectively facing the depressions 20 and 27. A plurality of elastic balls 32, preferably of rubber or like material, are arranged between respective sets of depressions 20, 30, and 27, 31, and a rod 33, integral with the plate 29, passes in clearance relation through an opening 34 in the cover plate 24. This rod 33 is secured to a sleeve 36 rigid with the mounting ring 14 through means of a strap 37, and the plate 29 is spaced from this strap by a spacer sleeve 38.

The depressions 20, 30, and 27, 31 are oval or elliptical in planform as typified by the depression 31 shown in Fig. 3, the major axis of each oval or ellipse being parallel to axis B, and the minor axis of each oval or ellipse being parallel to axis C. These depressions may have a circular or ellipsoidal profile according to the spring rates which may be desired along axes B and C.

The mode of action of the mounting device is as follows: When relative movement occurs between the ring 14 and the pedestal 18 along the axis A, the balls 32 between the plate 29 and either the face 19 or the face 26 will be compressed, according to the direction of action of the displacing force. Thus the balls will be compressed and will afford an elastic restraint to displacement on the basis of a spring rate determined by the elastic properties of the balls themselves. If displacement of the ring 14 relative to the pedestal 18 takes place along the axis B, the balls 32 are rolled along the several depressions in a direction parallel to their major axes. If the profile of the depression bottoms along their major axes is straight, there will be insignificant elastic restraint, while if the bottom profile of the depressions is curved, there will be some degree of elastic restraint depending upon the curvature.

If the ring 14 be displaced relative to the pedestal 18 along the axis C, the balls 32 will be rolled along the minor axes of the depressions which are provided with distinct curvature of such order as to endow the system with a definite degree of intermediate elastic restraint. Thus the system may fully subscribe to the teachings of the aforementioned patents. With any combination of displacement along the several axes, the balls 32 will always be in pure compression and it is obviously unnecessary and undesirable in the structure shown to rigidly secure the rubber elements to the structure.

In Fig. 4 is shown an alternate arrangement in which the plate 29' is somewhat thicker than the plate 29 to accommodate depressions 30' and 31' opposite one another on the opposite faces of the plate. Correspondingly the faces 19' and 26' are provided with a greater number of depressions whereby a greater number of balls 32 may be accommodated in the mounting device to afford greater capacity. Fig. 4 also shows the several depressions as having trapezoidal profiles and in which the slopes of the sides of the trapezoids may be so chosen as to endow the system with the desired spring rates along the axes B and C.

It is apparent that the pedestal 18 and the rod 33 may be reversed with respect to the engine and mounting ring and the specific details of structure may be modified in various ways without departing from the scope of the invention. It is also contemplated that the balls 32 might take the form of ovalized rollers within depressions or in engagement with flat faces having no depressions for engagement by the rollers.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an engine to support mounting system, a plurality of engine mounting units each including a pedestal comprising a substantially flat face having a plurality of cup-like depressions therein, said depressions having a straight elongation parallel to each other, a set of elastic balls seated in said depressions, a plate having depressions on both sides corresponding to those of the face, the inner plate side being engaged by said set of balls, a second set of balls in the recesses on the outer side of the plate, a rod extending outwardly from the central portion of the plate, and a cover, having depressions on its inner face within which the balls of the second set are engaged, said cover being secured at its periphery to the pedestal and having an opening for free passage of said rod, said pedestals being rigid with the support and said rods being rigid with the engine.

2. A mounting device for connecting a vibratory body member with a support member comprising a pedestal secured to one member said pedestal having a face including a plurality of grooves, said grooves having a straight elongation parallel to each other, a plate substantially parallel to said face having grooves in looking-glass symmetry to the face grooves, a plurality of balls of rubber or the like between said face and plate engaged in said grooves, a pedestal cover having a central hole, a rod passing through said hole secured at one end to said plate and at its other end to the other member, and a second plurality of balls of rubber or the like between the plate and the cover, the facing surfaces of the plate and cover having grooves, similar and parallel to the first grooves, within which the second plurality of balls engage.

3. In a system for elastically mounting an engine member on a support member spaced from the engine center of gravity, a plurality of mounting units between the engine and support and spaced apart one from the other; each unit comprising a pedestal secured to one member and having a flattened cavity the predominant plane of which is sloped to intersect the engine axis on the opposite side of the mounting plane from the engine, a plate within said cavity and similarly sloped, means to secure said plate to the other member, and resilient rollers of rubber or the like compressed between the opposed flattened surfaces of the pedestal cavity and plate.

4. In a system for elastically mounting an engine member on a support member spaced from the engine center of gravity, a plurality of mounting units between the engine and support and spaced apart one from the other; each unit comprising a pedestal secured to one member and having a flattened cavity the predominant plane of which is sloped to intersect the engine axis on the opposite side of the mounting plane from the engine, a plate within said cavity and similarly sloped, means to secure said plate to the other member, and resilient rollers of rubber or the like compressed between the opposed flattened surfaces of the pedestal cavity and plate, said flattened surfaces having facing elongated depressions having their principal axes disposed in a direction substantially radial with respect to the engine axis within which said rollers are disposed for substantially free rolling in a direction substantially radial with respect to the engine axis as the plate moves with respect to the pedestal in the same direction.

5. In a system for elastically mounting an engine member on a support member spaced from the engine center of gravity, a plurality of mounting units between the engine and support and spaced apart one from the other; each unit comprising a pedestal secured to one member and having a flattened cavity the predominant plane of which is sloped to intersect the engine axis on the opposite side of the mounting plane from the engine, a plate within said cavity and similarly sloped, means to secure said plate to the other member, and resilient rollers of rubber or the like compressed between the opposed flattened surfaces of the pedestal cavity and plate, said flattened surfaces having facing elongated depressions having their principal axes disposed in a direction substantially radial with respect to the engine axis within which said rollers are disposed for substantially free rolling in a direction substantially radial with respect to the engine axis as the plate moves with respect to the pedestal in the same direction, said balls being subject to compression only upon imposition of a force between the pedestal and plate normal to the plane of the flattened cavity, and being subject to shear only upon imposition of a force between the pedestal and plate on a line in the plane of the cavity and normal to the said substantially radial direction.

6. A mounting device for elastically mounting an engine member on a support member, comprising a first element secured to one of said members and having a flattened cavity therein, a flat element within said cavity and in clearance relation with the walls thereof, said flat element being secured to the other of said members, the facing surfaces of said flat element and cavity having a plurality of opposed depressions, said depressions having a straight elongation parallel to each other, and a plurality of balls of rubber or other resilient material between said facing surfaces and within said depressions.

EDWARD STORY TAYLOR.